(12) United States Patent
Dong et al.

(10) Patent No.: US 11,681,436 B2
(45) Date of Patent: Jun. 20, 2023

(54) SYSTEMS AND METHODS FOR ASYNCHRONOUS INPUT/OUTPUT SCANNING AND AGGREGATION FOR SOLID STATE DRIVE

(71) Applicant: Dell Products L.P., Round Rock, TX (US)

(72) Inventors: Wei Dong, Shanghai (CN); Weilin Liu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/096,163

(22) Filed: Nov. 12, 2020

(65) Prior Publication Data

US 2022/0147248 A1 May 12, 2022

(30) Foreign Application Priority Data

Nov. 6, 2020 (CN) .......................... 202011235820.0

(51) Int. Cl.
*G06F 3/06* (2006.01)

(52) U.S. Cl.
CPC .......... *G06F 3/0604* (2013.01); *G06F 3/0613* (2013.01); *G06F 3/0653* (2013.01); *G06F 3/0659* (2013.01); *G06F 3/0679* (2013.01)

(58) Field of Classification Search
CPC .... G06F 3/0604; G06F 3/0613; G06F 3/0653; G06F 3/0659; G06F 3/0679; G06F 3/061; G06F 3/064

See application file for complete search history.

(56) References Cited

U.S. PATENT DOCUMENTS

| | | | |
|---|---|---|---|
| 2017/0139826 A1* | 5/2017 | Sugimori | G06F 12/0246 |
| 2018/0356992 A1* | 12/2018 | Lamberts | G06F 3/068 |
| 2018/0356997 A1* | 12/2018 | Gorobets | G06F 3/0688 |
| 2018/0373428 A1* | 12/2018 | Kan | G06F 3/0616 |
| 2019/0198113 A1* | 6/2019 | Ben-Rubi | G11C 16/3459 |
| 2019/0310780 A1* | 10/2019 | Gholamipour | G06F 12/0246 |
| 2021/0149597 A1* | 5/2021 | Kim | G06F 3/0653 |
| 2021/0174224 A1* | 6/2021 | Sharon | G06F 3/0659 |
| 2021/0278993 A1* | 9/2021 | You | G06F 3/0659 |
| 2021/0326067 A1* | 10/2021 | Li | G06F 12/0246 |

* cited by examiner

*Primary Examiner* — Charles Rones
*Assistant Examiner* — Tong B. Vo
(74) *Attorney, Agent, or Firm* — Jackson Walker L.L.P.

(57) ABSTRACT

An information handling system may include a processor and a scanning agent including a program of instructions embodied in computer-readable media communicatively coupled to the processor, and configured to, asynchronously from input/output operations to a solid state drive communicatively coupled to the processor: scan sequences of logical block addresses corresponding to consecutively occurring input/output operations to the solid state drive; determine logical block addresses that are frequently proximate to each other in the sequences; and communicate information regarding the logical block addresses that are frequently proximate to each other in the sequences to the solid state drive, such that a controller of the solid state drive uses the information to organize data in physical pages of the solid state drive such that at least one physical page includes logical block addresses that are frequently proximate to each other in the sequences.

8 Claims, 5 Drawing Sheets

# SYSTEMS AND METHODS FOR ASYNCHRONOUS INPUT/OUTPUT SCANNING AND AGGREGATION FOR SOLID STATE DRIVE

TECHNICAL FIELD

The present disclosure relates generally to information handling systems and, more particularly, to systems and methods for asynchronous input/output scanning and aggregation for a solid state drive, in order to maximize read efficiency for the solid state drive.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often employ storage resources (e.g., hard disk drives) to store data and programs of instructions for later retrieval.

Increasingly, information handling systems employ solid-state storage devices (e.g., solid-state drives), in lieu of or in addition to traditional magnetic hard disk drives. A solid-state device (SSD) is a data storage device that uses solid-state memory (e.g., flash memory) to store persistent data. An SSD may emulate a hard disk drive interface, thus easily replacing it in most applications.

SSDs often use NAND flash memory as their underlying storage medium. In a traditional read request from NAND flash memory, the logical block address of the read request may map to a data slip (e.g., 4 kilobytes). In existing approaches, such data slips are randomly distributed through different pages in the NAND flash memory. However, according to typical NAND flash memory behavior, read operations are page based, meaning a read operation will carry out a read of one page of data (e.g., 16 kilobytes) from a NAND array to a NAND cache (e.g., page register). However, only the data slip requested is transferred to the host requesting the read operation and the rest of the page (e.g., 12 kilobytes) is dropped, meaning each read operation is only 25% effective in terms of data throughput. For a dual-plane read mode, only one data slip out of two pages is valid, meaning each read operation is only 12.5% effective in terms of data throughput. Such inefficiency negatively affects data throughput and performance.

SUMMARY

In accordance with the teachings of the present disclosure, the disadvantages and problems associated with inefficiency of read operations in NAND flash memory may be reduced or eliminated.

In accordance with embodiments of the present disclosure, an information handling system may include a processor and a scanning agent comprising a program of instructions embodied in computer-readable media communicatively coupled to the processor, and configured to, asynchronously from input/output operations to a solid state drive communicatively coupled to the processor: scan sequences of logical block addresses of consecutive input/output operations to the solid state drive; determine logical block addresses that are frequently proximate to each other in the sequences; and communicate information regarding logical block addresses that are frequently proximate to each other in the sequences to the solid state drive, such that a controller of the solid state drive uses the information to organize data in physical pages of the solid state drive such that at least one physical page comprises logical block addresses that are frequently proximate to each other in the sequences.

In accordance with embodiments of the present disclosure, a method may include, asynchronously from input/output operations to a solid state drive: scanning sequences of logical block addresses of consecutive input/output operations to the solid state drive; determining logical block addresses that are frequently proximate to each other in the sequences; and communicating information regarding logical block addresses that are frequently proximate to each other in the sequences to the solid state drive, such that a controller of the solid state drive uses the information to organize data in physical pages of the solid state drive such that at least one physical page comprises logical block addresses that are frequently proximate to each other in the sequences.

In accordance with embodiments of the present disclosure, a solid state drive may include memory media for storing data and a controller configured to receive information regarding logical block addresses that are frequently proximate to each other in input/output operations to the memory media and based on the information, organize data in physical pages of the memory media such that at least one physical page comprises logical block addresses that are frequently proximate to each other in the sequences.

In accordance with embodiments of the present disclosure, a method may include receiving information regarding logical block addresses that are frequently proximate to each other in input/output operations to the memory media and based on the information, organizing data in physical pages of the memory media such that at least one physical page comprises logical block addresses that are frequently proximate to each other in the sequences.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state device (SSD), a RAM-drive, a SECURE DIGITAL card, a SECURE DIGITAL drive, or another suitable computer-readable storage medium or a combination of two or more of these, where appropriate. Herein, reference to a computer-readable medium excludes any medium that is not eligible for patent protection under 35 U.S.C. § 101. Herein, reference to a computer-readable medium excludes transitory forms of signal transmission (such as a propagating electrical or electromagnetic signal per se) to the extent that they are not eligible for patent protection under 35 U.S.C. § 101.

Figure 1:
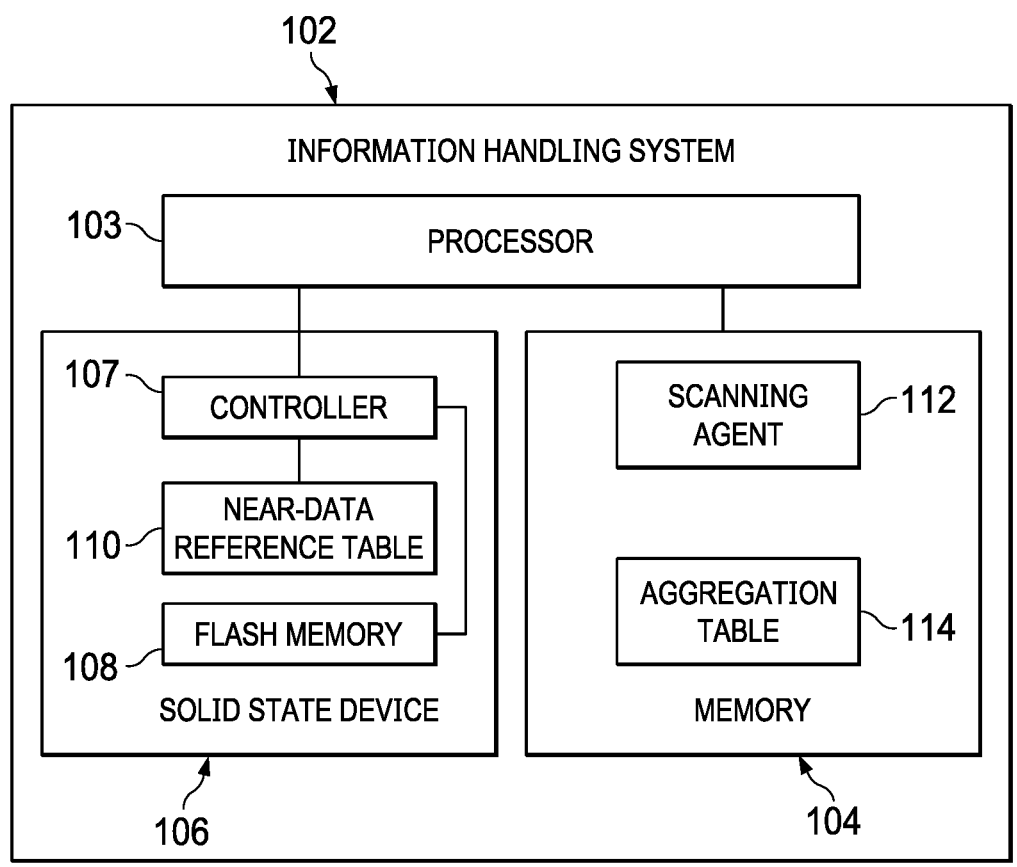
FIG. 1 illustrates a block diagram of an example information handling system, in accordance with embodiments of the present disclosure.

FIG. 1 illustrates a block diagram of an example information handling system 102, in accordance with embodiments of the present disclosure. In certain embodiments, information handling system 102 may be a personal computer (e.g., a desktop computer or a portable computer). In other embodiments, information handling system 102 may include a server. As depicted in FIG. 1, information handling system 102 may comprise a processor 103, a memory 104 communicatively coupled to processor 103, and a solid state device (SSD) 106 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory 104, SSD 106, and/or another component of information handling system 102.

Memory 104 may be communicatively coupled to processor 103 and may comprise any system, device, or apparatus configured to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, solid state storage, or any suitable selection and/or array of volatile or non-volatile memory that retains data after power to information handling system 102 is turned off. As shown in FIG. 1, memory 104 may have stored thereon a scanning agent 112 and an aggregation table 114.

Scanning agent 112 may comprise a program of executable instructions that may be read and executed by processor 103 to perform the functionality of scanning agent 112. In some embodiments, scanning agent 112 may comprise a component of an operating system (e.g., a driver) of information handling system 102. In other embodiments, scanning agent 112 may comprise a standalone application program that executes on top of an operating system. As described in greater detail below, scanning agent 112 may scan sequences of logical block addresses (LBAs) of consecutive input/output operations to SSD 106, separate such sequences into rolling windows, and determine LBAs that are frequently near to each other in sequences of LBAs for read operations. So as to not negatively affect input/output processes, scanning agent 112 may perform scanning and aggregation asynchronously. As part of such functionality, scanning agent 112 may generate aggregation table 114. Aggregation table 114 may comprise any list, map, table, database, or other suitable data structure that sets forth, for each of a plurality of LBA sequences, a frequency of occurrence of such sequence in consecutive input/output operations. For each LBA sequence that has a frequency in excess of a threshold frequency, scanning agent 112 may communicate an identity of such sequence to SSD 106 (e.g., via a vendor-unique command associated with SSD 106).

SSD 106 may be communicatively coupled to processor 103, and may include any system, device, or apparatus configured to retain program instructions or data for a period of time (e.g., a computer-readable medium) which includes solid-state memory as a storage medium (e.g., flash memory). As shown in FIG. 1, SSD 106 may include a controller 107, flash memory 108, and near-data reference table 110. Although FIG. 1 depicts SSD 106 as being integral to information handling system 102, certain embodiments of information handling system 102 may include SSD 106 remotely coupled to information handling system 102 (e.g., by means of a network).

Controller 107 may be communicatively coupled to processor 103 and may include any system, device, or apparatus configured to manage and/or control SSD 106 and its various components. For example, in some embodiments, controller 107 may be configured to read data from and/or write data to flash memory 108 comprising SSD 106. In such embodiments, controller 107 may reference near-data reference table 110 in performing such reads and writes in order to translate virtual logical block addresses (LBAs) of SSD 106 (as "seen" by processor 103) to physical LBAs of flash memory 108. In the same or alternative embodiments, controller 107 may be configured maintain and/or control the contents of near-data reference table 110. In particular, controller 107 may receive information from scanning agent 112 regarding LBA sequences that occur in excess of a frequency threshold, and store such sequences in near-data reference table 110. Near-data reference table 110 may comprise any list, map, table, database, or other suitable data structure that sets forth LBA sequences that occur in excess of a frequency threshold. Accordingly, controller 107 may process the information stored in near-data reference table 110 and based thereon, combine data slips associated with such frequent LBA sequences into the same physical page on flash memory 108 (e.g., during garbage collection). Accordingly, for subsequent read operations that access such physical pages, a one-page hit rate for data slops may be increased.

Flash memory 108 may be communicatively coupled to controller 107 and may include a non-volatile storage medium that utilizes flash-based storage media and/or similar storage media. In some embodiments, flash memory 108 may comprise NAND flash memory. In the depicted embodiment, flash memory 108 may store information associated with input/output operations to SSD 106 (e.g., data, instructions, or other information subject to write operations to SSD 106 and/or data, instructions, and/or other information responsive to read operations to SSD 106).

Figure 2:
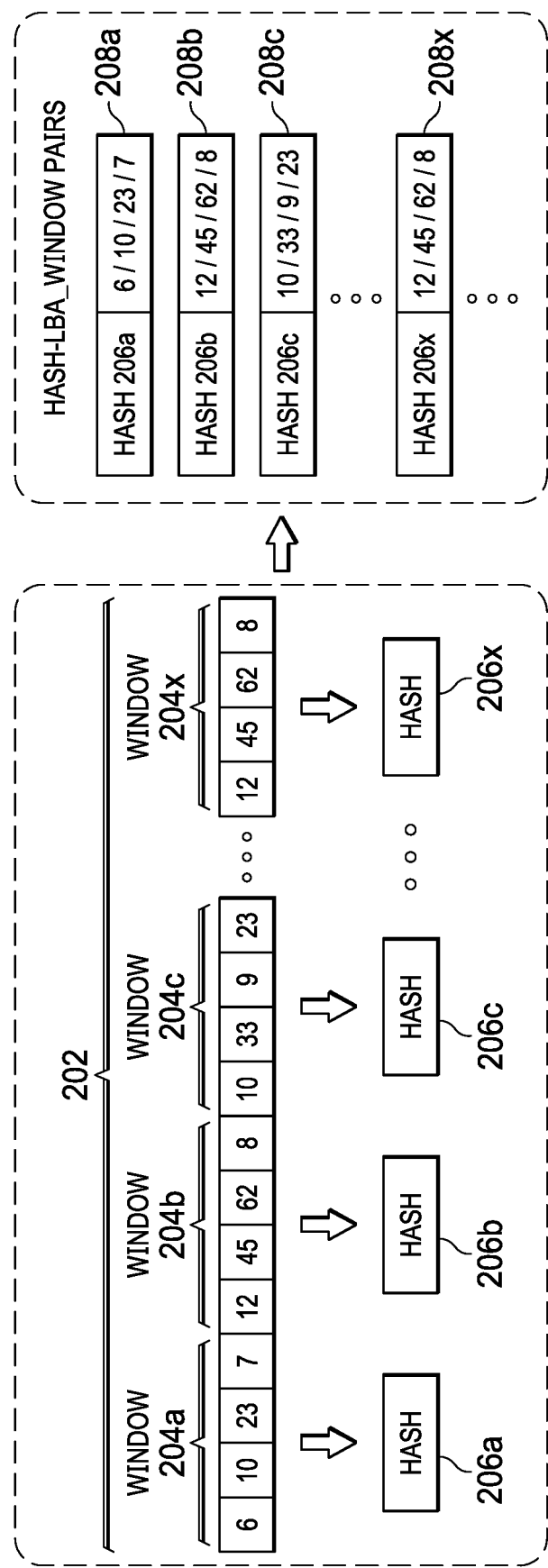
FIG. 2 illustrates a flow diagram depicting generation of hash-LBA window pairs by a scanning agent, in accordance with embodiments of the present disclosure.

FIG. 2 illustrates a flow diagram depicting a generation of hash-LBA window pairs 208 by scanning agent 112, in accordance with embodiments of the present disclosure. As shown in FIG. 2, scanning agent 112 may separate an LBA sequence 202 associated with consecutive input/output operations into a plurality of rolling windows 204 (e.g., rolling windows 204a, 204b, 204c, 204x). For each rolling window 204, scanning agent 112 may calculate a hash 206 (e.g., hash 206a, 206b, 206c, 206x) or other fingerprint for such rolling window 204. Scanning agent 112 may further match each hash 206 with its associated LBA window 204 to generate a plurality of hash-LBA window pairs 208 (e.g., hash-LBA window pairs 208a, 208b, 208c, 208x).

Figure 3:
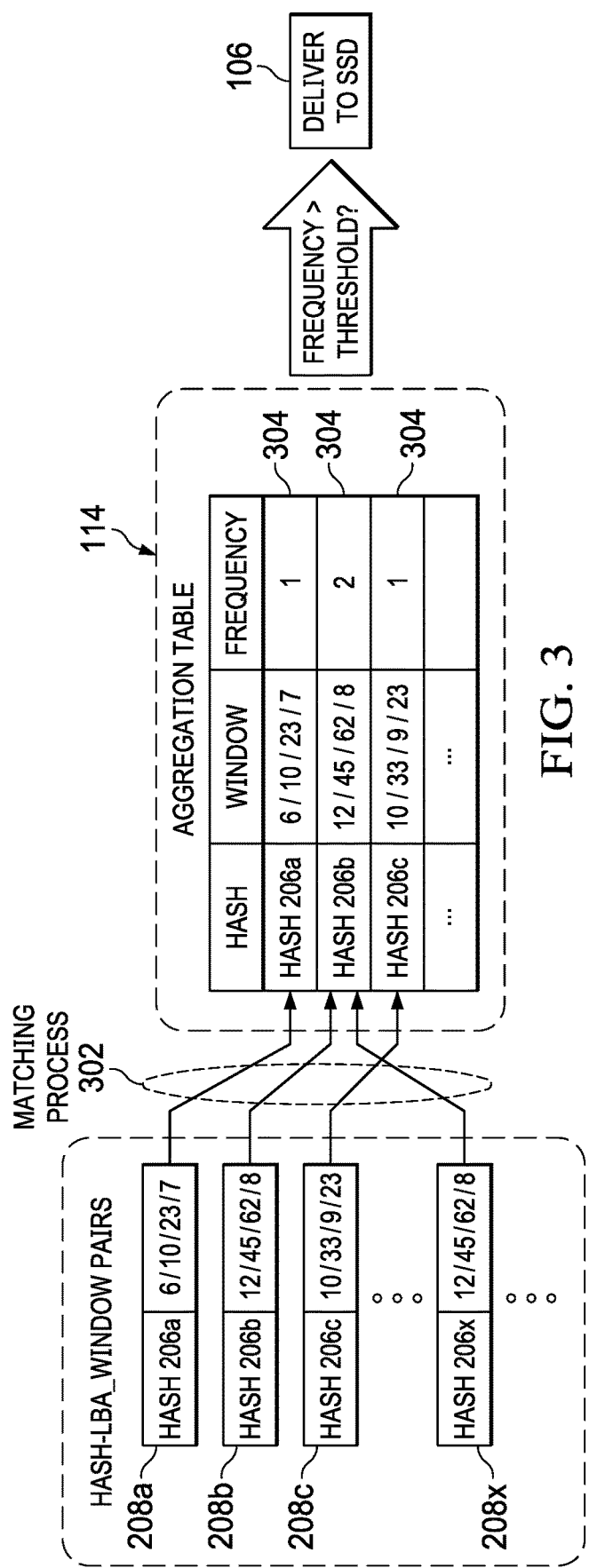
FIG. 3 illustrates a flow diagram depicting generation of an aggregation table and communication of information to an SSD regarding LBA sequences that occur in excess of a frequency threshold, in accordance with embodiments of the present disclosure.

FIG. 3 illustrates a flow diagram depicting generation of aggregation table 114 and communication of information to SSD 106 regarding LBA sequences that occur in excess of a frequency threshold, in accordance with embodiments of the present disclosure. As shown in FIG. 3, scanning agent 112 may apply a matching process 302 to hash-LBA window pairs 208 to generate aggregation table 114, wherein aggregation table 114 includes a plurality of entries 304, each entry 304 setting forth for a particular hash-LBA window pair 208 a frequency of occurrence of hash-LBA window pair 208 within a predefined duration of time. As also shown in FIG. 3, scanning agent 112 may analyze aggregation table 114 to determine if any entries 304 indicate any hash-LBA window pairs 208 having a frequency of occurrence equal or greater to a predefined frequency threshold. For each particular hash-LBA window pair 208 having a frequency over the predefined frequency threshold, scanning agent 112 may communicate information to SSD 106 regarding the LBAs set forth in such hash-LBA window pair 208.

Figure 4:
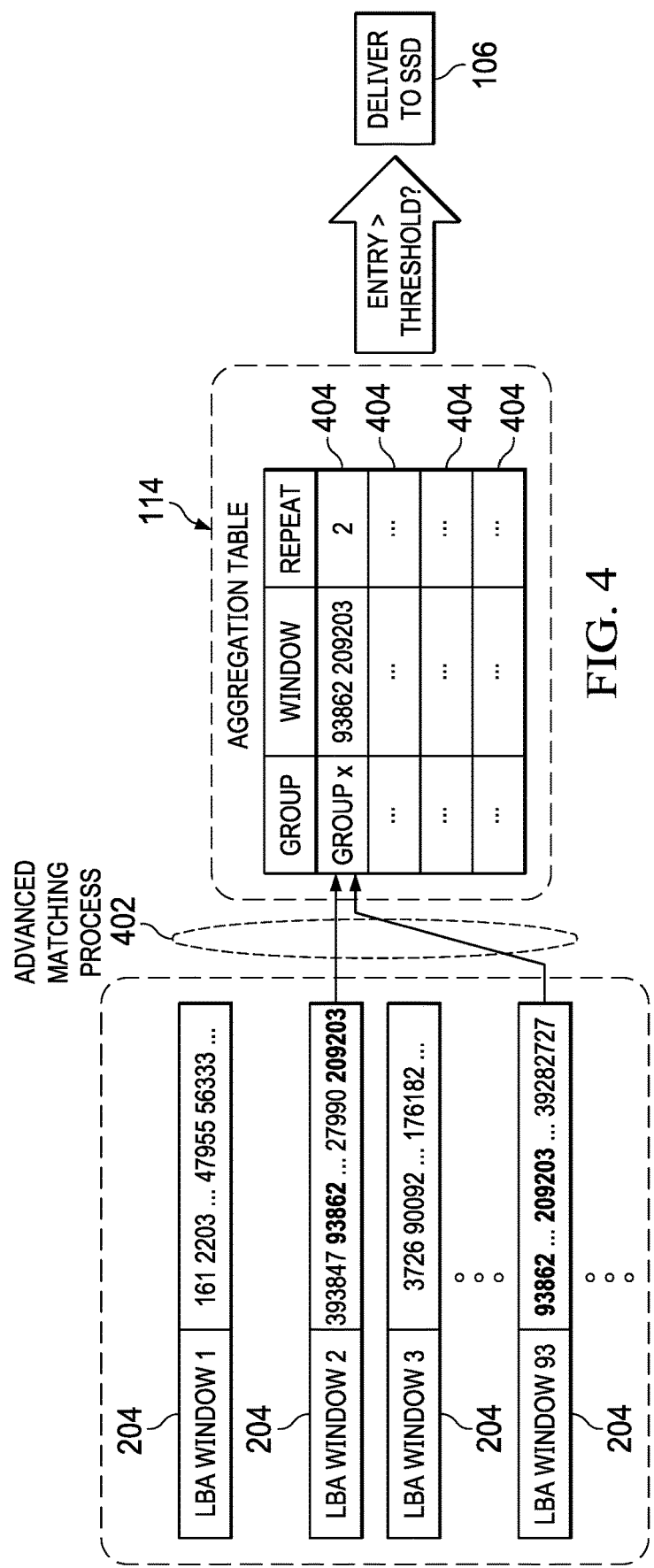
FIG. 4 illustrates a flow diagram depicting an alternative approach for generation of an aggregation table and communication of information to an SSD regarding LBA sequences that occur in excess of a frequency threshold, in accordance with embodiments of the present disclosure.

FIG. 4 illustrates another flow diagram depicting an alternative approach to generation of aggregation table 114 and communication of information to SSD 106 regarding LBA sequences that occur in excess of a frequency threshold, in accordance with embodiments of the present disclosure. In the approach depicted in FIG. 4, scanning agent 112 may generate a scan of a plurality of rolling LBA windows 204 and apply an advanced matching process 402 that may handle various LBA patterns, identify LBAs that are commonly sequenced in proximity to one another, but not necessarily in successive proximity, and generate aggregation table 114 such that entries 404 of aggregation table identify groups of LBAs commonly sequenced in proximity to one another and a frequency at which they are sequenced in proximity to one another. As also shown in FIG. 4, scanning agent 112 may analyze aggregation table 114 to determine if any entries 404 indicate any groups having a frequency of occurrence equal or greater to a predefined frequency threshold. For each particular group having a frequency over the predefined frequency threshold, scanning agent 112 may communicate information to SSD 106 regarding the LBAs set forth in such group.

Figure 5:
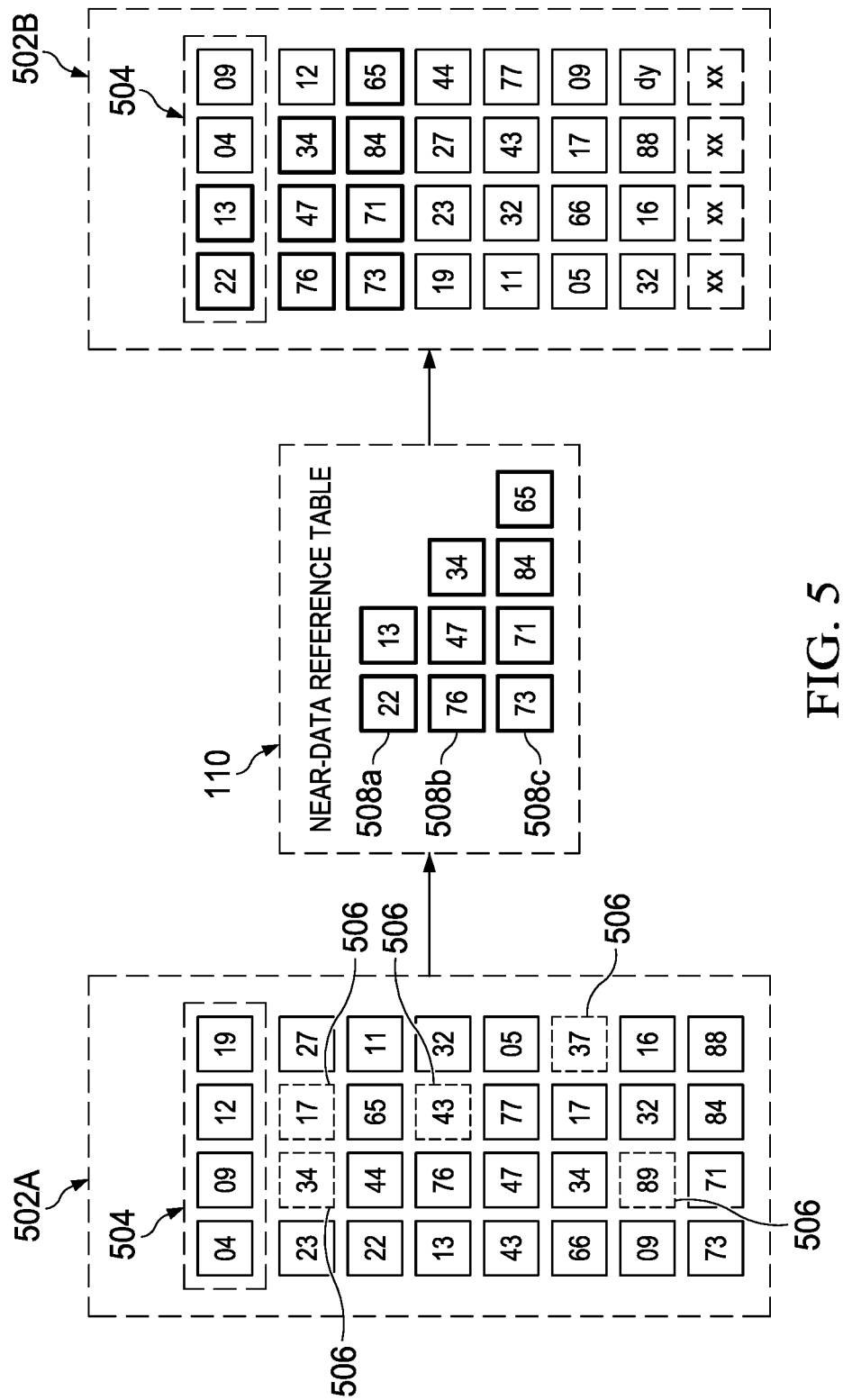
FIG. 5 illustrates a flow diagram depicting aggregation of data in an SSD based on entries of a near-data reference table, in accordance with embodiments of the present disclosure.

FIG. 5 illustrates a flow diagram depicting aggregation of data in SSD 106 based on entries of near-data reference table 110, in accordance with embodiments of the present disclosure. As described above, scanning agent 112 may communicate information to SSD 106 regarding LBAs that frequently appear in proximity to one another in input/output operations, and controller 107 may store such information in near-data reference table 110. As shown in FIG. 5, near-data reference table 110 may include a plurality of entries 508 (e.g., entries 508a, 508b, 508c), wherein each entry 508 sets forth LBAs associated with data slips in which the LBAs are frequently sequenced in proximity to one another during input/output operations. Prior to garbage collection or other data operation within SSD 106, a physical block 502A of SSD 106 may comprise a plurality of physical pages 504, wherein some pages 504 include data slips 506 with invalid data. As is known in the art, when performing garbage collection, controller 107 may rewrite the data of physical block 502A into a new physical block 502B, excluding the invalid data. However, in accordance with embodiments of the present disclosure, controller 107 may be configured to, based on entries 508 of near-data reference table 110, rewrite the data onto physical block 502B such that one or more physical pages 504 of physical block 502B are associated with LBAs having data slips sequenced proximate to each other in prior input/output operations, as determined by scanning agent 112. For example, controller 107 may place data slips associated with LBAs of entry 508a into a first physical page 504, data slips associated with LBAs of entry 508b into a second physical page 504, and data slips associated with LBAs of entry 508c into a third physical page 504.

A component of information handling system 102 may include an interface, logic, and/or other suitable elements. An interface receives input, sends output, processes the input and/or output, and/or performs other suitable operations. An interface may comprise hardware and/or software. Logic performs the operations of the component; for example, executes instructions to generate output from input. Logic may include hardware, software, and/or other logic. Logic may be encoded in one or more tangible computer readable storage media and may perform operations when executed by a processor or other component.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising:
    receiving proximity information, indicative of frequently proximate logical block address (LBA) groups, each comprising two or more LBAs proximate to each other, that occur in excess of a frequency threshold, within LBA sequences corresponding to consecutively occurring solid state drive (SSD) input/output operations; and
    based on the proximity information, organizing data in physical pages of the SSD, wherein at least one physical page includes each of the two or more LBAs included in at least one of the frequently proximate LBA groups, and wherein the frequently proximate LBA groups are identified by scanning of the LBA sequences.

2. A scan method comprising:
    asynchronously performing scan operations include:
        scanning logical block address (LBA) sequences corresponding to consecutively occurring SSD input/output operations, wherein the scanning of the LBA sequences identifies frequently proximate LBA groups comprising two or more LBAs proximate to each other more frequently than a threshold frequency; and
        communicating proximity information indicative of the frequently proximate LBA groups to an SSD controller configured to organize data in physical pages of the SSD, wherein at least one physical page includes each of the two or more LBAs corresponding to at least one of the frequently proximate LBA groups.

3. The method of claim 2, wherein said scanning comprises scanning rolling windows of the consecutively occurring SSD input/output operations.

4. The method of claim 3, wherein the scan operations include:
    generating a fingerprint corresponding to each of the rolling windows; and
    determining a frequency of occurrence of each said fingerprint.

5. A solid state drive (SSD) comprising:
    memory media for storing data; and
    a controller configured to:
        respond to receiving proximity information indicative of frequently proximate logical block address (LBA) groups, each comprising two or more LBAs proximate to each other, that occur in excess of a frequency threshold, within LBA sequences corresponding to consecutively occurring SSD input/output operations, by organizing data in physical pages of the SSD wherein at least one physical page includes each of the two or more LBAs included in at least one of the frequently proximate LBA groups, and wherein the frequently proximate LBA groups are identified by scanning of the LBA sequences.

6. An information handling system comprising:

a processor;

a solid state drive (SSD) communicatively coupled to the processor; and a computer-readable medium, communicatively coupled to the processor, including processor executable instructions that, when executed by the processor, cause the system to perform scan operations asynchronously, wherein the scan operations include:

scanning logical block address (LBA) sequences corresponding to consecutively occurring SSD input/output operations, wherein the scanning of the LBA sequences identifies the frequently proximate LBA groups comprising two or more LBAs proximate to each other more frequently than a threshold frequency; and communicating proximity information indicative of the frequently proximate LBA groups to an SSD controller configured to organize data in physical pages of the SSD, wherein at least one physical page includes each of the two or more LBAs corresponding to at least one of the frequently proximate LBA groups.

7. The information handling system of claim 6, wherein said scanning comprises scanning rolling windows of the consecutively occurring SSD input/output operations.

8. The information handling system of claim 7, wherein the scan operations include:

generating a fingerprint corresponding to each of the rolling windows; and determining a frequency of occurrence of each said fingerprint.

* * * * *